United States Patent
Kalogiros et al.

(10) Patent No.: US 12,386,013 B2
(45) Date of Patent: Aug. 12, 2025

(54) METHOD FOR DETECTING ANOMALIES IN A POSITIONING SYSTEM AND POSITIONING ENGINE FOR A POSITIONING SYSTEM

(71) Applicant: u-blox AG, Thalwil (CH)

(72) Inventors: Dimitris Kalogiros, Thalwil (CH); Hariharasudhan Vigneswaran, Thalwil (CH); Matthias Mahlig, Thalwil (CH)

(73) Assignee: u-blox AG, Thalwil (CH)

( * ) Notice: Subject to any disclaimer, the term of this patent is extended or adjusted under 35 U.S.C. 154(b) by 359 days.

(21) Appl. No.: 17/988,108

(22) Filed: Nov. 16, 2022

(65) Prior Publication Data

US 2023/0176167 A1 Jun. 8, 2023

(30) Foreign Application Priority Data

Dec. 2, 2021 (EP) .................................. 21212030

(51) Int. Cl.
| | | |
|---|---|---|
| *H04L 12/28* | (2006.01) | |
| *G01S 5/00* | (2006.01) | |
| *G01S 5/02* | (2010.01) | |

(52) U.S. Cl.
CPC .............. *G01S 5/021* (2013.01); *G01S 5/011* (2020.05)

(58) Field of Classification Search
CPC ...... G01S 5/021; G01S 5/011; G01S 5/02527; G01S 5/0244; H04W 24/04; H04W 4/02; H04W 24/08; H04W 64/00
See application file for complete search history.

(56) References Cited

U.S. PATENT DOCUMENTS

| | | | | |
|---|---|---|---|---|
| 2014/0349675 | A1* | 11/2014 | Schatzberg | G01S 5/011 455/456.1 |
| 2016/0330041 | A1* | 11/2016 | Wang | G01S 5/0252 |
| 2017/0064016 | A1* | 3/2017 | Ishii | H04W 4/02 |
| 2024/0340610 | A1* | 10/2024 | Lindgren | H04W 64/00 |

FOREIGN PATENT DOCUMENTS

| | | |
|---|---|---|
| CN | 111852456 | 10/2020 |
| WO | WO 2021209117 | 10/2021 |

OTHER PUBLICATIONS

Extended Search Report in European Appln. No. 21212030.7, dated May 23, 2022, 5 pages.

* cited by examiner

*Primary Examiner* — Dhaval V Patel
(74) *Attorney, Agent, or Firm* — Fish & Richardson P.C.

(57) ABSTRACT

A method for detecting anomalies in a positioning system comprises receiving, for a plurality of locator devices (ANC1, ANC2, ANC3, ANC4), respective location indicators associated with at least one mobile device (TG1, TG2, TG3), determining a position of the at least one mobile device (TG1, TG2, TG3) based on the received location indicators, acquiring, for at least one of the location indicators received, a confidence indicator associated with the at least one of the location indicators, determining, for each acquired confidence indicator, whether a confidence criterion is met, and storing an anomaly indicator in an anomaly cache, if the confidence criterion is not met, wherein each anomaly indicator is associated with the locator device, for which the location indicator is received; and generating an anomaly alert message for at least one of the locator devices based on an evaluation of the anomaly indicators that are stored for the at least one of the locator devices.

20 Claims, 4 Drawing Sheets

METHOD FOR DETECTING ANOMALIES IN A POSITIONING SYSTEM AND POSITIONING ENGINE FOR A POSITIONING SYSTEM

CROSS-REFERENCE TO RELATED APPLICATIONS

This application claims the benefit of priority to European Application No. 21212030.7, filed on Dec. 2, 2021, the contents of which are hereby incorporated by reference.

TECHNICAL FIELD

This disclosure relates to a method for detecting anomalies in a positioning system and to a positioning engine for a positioning system. The disclosure further relates to a computer program product and a computer readable storage medium.

BACKGROUND ART

In many applications like indoor positioning systems, IPS, or real-time location services, RTLS, one key element is to determine a position of a mobile device like a tag based on position information relative to multiple locator devices. Such determination is for example performed in a positioning engine using various mathematical models.

In conventional installations of a positioning system, correct measurements may be performed with correctly deployed and calibrated anchor points. However, in real-life, multiple things can go wrong after deployment. For example, some of the anchor points in a positioning system may start to send no or incorrect data, e.g. by misaligning the anchor point by mistake or even blocking the anchor point, respectively its antenna. This can lead to wrong determinations of the position of a mobile device.

In conventional systems such wrong determinations may be ignored or at most noticed based on an evaluation of abnormal position estimates or the like.

SUMMARY OF INVENTION

An object to be achieved is to provide an improved processing concept that allows an efficient detection of anomalies in a positioning system.

This object is achieved with the subject-matter of the independent claims. Embodiments and developments derive from the dependent claims.

According to the present disclosure, in a positioning system, respective location indicators are received for a plurality of locator devices, wherein the location indicators are associated with at least one mobile device. "For" a locator device herein includes that the location indicator is either received from this locator device or from the at least one mobile device based on a localization signal transmitted from this locator device to the at least one mobile device. Based on the received location indicators, a position of the at least one mobile device is determined. For example each location indicator includes one of a direction between the respective locator device and the mobile device, a distance between the respective locator device and the mobile device, and a direction and a distance between the respective locator device and the mobile device.

The improved processing concept is based on the idea that in addition to the location indicators alone, respective confidence indicators associated with one or more of the location indicators are acquired. Based on these confidence indicators, it can be determined whether a confidence criterion is met and, if the confidence criterion is not met, an anomaly indicator is stored in an anomaly cache. Since the underlying confidence indicator is associated with a specific location indicator, which is furthermore associated with a specific locator device, each anomaly indicator can be associated with the respective locator device. Furthermore, as anomaly indicators may be stored continuously, if the confidence criterion is continuously missed, a history regarding anomalies can be stored in the anomaly cache for each of the locator devices in the positioning system. Furthermore, anomaly alert messages may be generated based on an evaluation of stored anomaly indicators. For example, the confidence criterion may be a configurable threshold of the confidence indicator, e.g. depending on the type of confidence indicator.

Due to the acquisition of the confidence indicators in addition to the location indicators, anomalies can be detected efficiently.

In an example implementation of a method for detecting anomalies in a positioning system according to the improved processing concept, further to receiving respective location indicators and determining a position of at least one mobile device based on the received location indicators, for at least one of the received location indicators, a confidence indicator associated with the at least one of the location indicators is acquired. For each acquired confidence indicator, it is determined whether a confidence criterion is met, and an anomaly indicator is stored in an anomaly cache if the confidence criterion is not met. Therein each anomaly indicator is associated with the locator device for which the location indicator is received. An anomaly alert message is generated for each one of the locator devices based on an evaluation of the anomaly indicators that are stored for the at least one of the locator devices.

For example, the evaluation of the anomaly indicators may be based on a number of the anomaly indicators that are stored for the at least one of the locator devices. For example, if the number of anomaly indicators stored for one locator device exceeds a predefined number, the anomaly alert message may be generated. The evaluation may also be based on a predefined period of time. For example, the number of anomaly indicators that are stored for the at least one of the locator devices within the predefined period of time are evaluated for generating the anomaly alert message.

In addition, or as an alternative, the evaluation of the anomaly indicators may be based on an output of a trained machine learning algorithm processing the stored anomaly indicators and/or the confidence indicators associated with the stored anomaly indicators. For example, the trained machine learning algorithm may be trained with various training sets of anomaly caches, together with a respective classification of whether or not to generate an anomaly alert message for the anomaly caches. Also in such an implementation the evaluation can be based on the anomaly indicators that are stored for the at least one of the locator devices within a predefined period of time.

In various implementations each anomaly indicator is further associated with the mobile device, with which the confidence indicator is associated via the corresponding locator indicator. For example, a specific combination of locator device and mobile device may be stored with the anomaly indicator. This may, for example, be used to identify abnormal interaction or collaboration in a specific combination of locator device and mobile device. Furthermore, abnormal behavior of a mobile device may also be identified in this way.

There are various ways for acquiring the confidence indicator. For example, the confidence indicator may be determined based on one or more of the location indicators and/or values or indicators derived therefrom. In addition or as an alternative, other signal data associated with the respective location indicator can be evaluated for acquiring the confidence indicator.

For example, a locus may be defined that is based on the at least one of the location indicators, wherein the locus is associated with the at least one mobile device. A distance value between the determined position of the at least one mobile device and the locus is determined. The confidence indicator can be determined based on the determined distance value. A locus may be related to one or more locator devices respectively their location indicators.

In this disclosure, a locus, plural 'loci', is a set of all points, commonly a line, a line segment, a curve or a plane, whose location satisfies or is determined by one or more specified conditions. Here, the specified conditions are given by the location indicators. It is assumed that the accuracy of the location indicators decreases with a distance between the (estimated) position and the locus. Hence, the confidence indicator is determined according to such a dependency, respectively the determined distance value. The confidence criterion may be a threshold distance or derived from such threshold distance, for example. Assuming that deviations between estimated position and locus should not exceed one or two meters, the threshold distance may be chosen in the range between 1 m and 7 m, or even in the range between 2 m and 5 m. The exact value may depend on the type and/or technology of the locator device.

In some implementations a distance value, respectively a further distance value, is determined between the determined position of the at least one mobile device and a known position of the locator device, for which the at least one of the location indicators is received. The confidence indicator can be determined based on the determined further distance value. For example, if a distance between the mobile device and the respective locator device is too large, e.g. exceeds a threshold distance, confidence in the respective location indicator for that locator device may be diminished, such that an anomaly indicator may be stored in the anomaly cache in such a case. The confidence criterion may be the threshold distance or derived from such threshold distance, for example.

In some implementations a weight factor associated with the at least one of the location indicators and/or the locator devices, for which the at least one of the location indicators is received, is received or determined. The confidence indicator can be determined based on the weight factor. In such an implementation the position of the mobile device is determined based on the received location indicators and the weight factor. For example, the location indicator is weighted with the weight factor in the process of determining the position of the at least one mobile device, such that a lower weight factor indicates a lower confidence. The weight factor may be in the range between 0 and 1. The weight factor itself may be calculated based on the location indicator itself or independently of the location indicator, such that only other factors associated with the locator device and/or signal properties of the location indicator are taken into account. The confidence criterion may be a threshold weight or derived from such threshold weight, for example.

In some implementations, for acquiring the confidence indicator, quality information associated with the at least one of the location indicators is received and the confidence indicator is determined based on the received quality information. The confidence criterion may be a quality threshold or derived from such quality threshold, for example.

The quality information may comprise one or more of the following: a signal strength associated with the at least one of the location indicators; a number of antenna elements of the locator device, for which the at least one of the location indicators is received; a noise value, e.g. a signal-to-noise ratio, SNR, associated with the at least one of the location indicators; and/or a quality value of a reference period of a sine wave associated with the at least one of the location indicators and/or a k-factor of the received signal associated with the at least one of the location indicators. For example, the better the sine wave associated with the at least one of the location indicators resembles a perfect sine wave, the better the quality value may be assessed.

The various implementations of the methods may be performed in full or at least in part in a positioning engine for a positioning system.

According to another embodiment of the improved processing concept, a positioning engine for a positioning system is provided. The positioning engine is configured for receiving, for a plurality of locator devices, respective location indicators associated with at least one mobile device. For example, each location indicator indicates a position of the at least one mobile device relative to the locator device, for which the location indicator is received. The positioning engine is further configured for determining a position of the at least one mobile device based on the received location indicators, and for acquiring, for at least one of the received location indicators, a confidence indicator associated with the at least one of the location indicators.

The positioning engine is further able to determine, for each acquired confidence indicator, whether a confidence criterion is met. An anomaly indicator is stored in an anomaly cache, e.g. within the positioning engine, if the confidence criterion is not met. Therein each anomaly indicator is associated with the locator device, for which the location indicator is received. The positioning engine generates an anomaly alert message for at least one of the locator devices based on an evaluation of the anomaly indicators that are stored for the at least one of the locator devices.

For performing the respective actions, the positioning engine may comprise a communication module, e.g. for communicating with the locator devices and other communication partners, e.g. for providing the anomaly alert messages. Furthermore, the positioning engine may comprise a processing unit and a memory for the various determination and storage actions.

The positioning engine may be a local positioning engine being located in the same area respectively the same local network as the locator devices or even being part of one of the locator devices. However, the positioning engine may also be implemented as a service component in a network cloud, e.g. over the internet. In some implementations the positioning engine respectively its function may be distributed between a locator device and a service component in a network cloud. For example, receiving of the location indicators and determining the position of a mobile device may be performed in part being implemented in a locator device, while the remaining functions relating to the confidence indicators etc. may be implemented in a service component in a network cloud. Other implementations should not be excluded by these examples.

Further implementations and developments of the positioning engine become readily apparent for the skilled reader from the various implementations described above in conjunction with the method for detecting anomalies in a positioning system.

According to one embodiment of the improved processing concept, a computer program product comprises instructions that may be stored in a preferably non-transitory computer-readable storage medium, the instructions enabling a computer system with one or more processors to execute a method according to one of the implementations described above. The computer system may be implemented within a positioning engine and/or a locator device and may be distributed.

Furthermore, a computer system may have one or more processors and a storage medium having computer program instructions stored therein, enabling the one or more processors to execute a method according to one of the implementations described above.

BRIEF DESCRIPTION OF DRAWINGS

The improved processing concept will be explained in more detail in the following with the aid of the drawings. Elements and functional blocks having the same or similar function bear the same reference numerals throughout the drawings. Hence their description is not necessarily repeated in the following drawings.

In the drawings.

DETAILED DESCRIPTION

Figure 1:
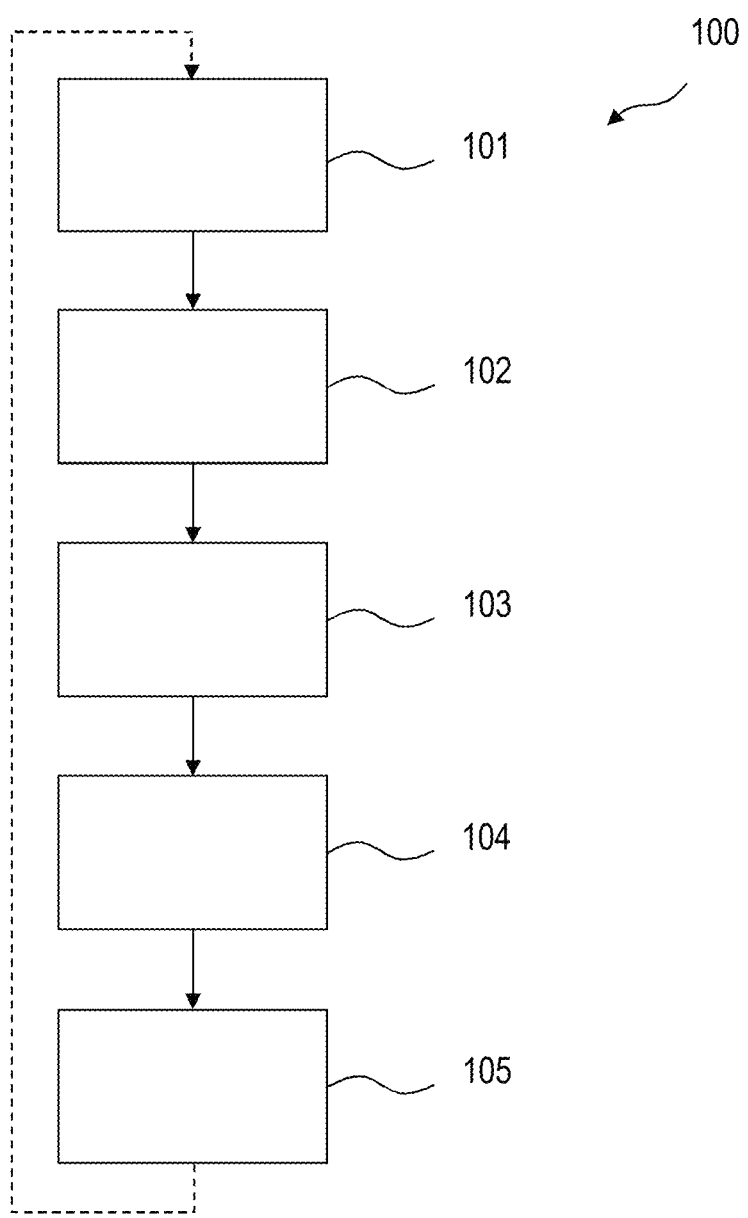
FIG. 1 shows a flowchart of a method for detecting anomalies in a positioning system.

FIG. 1 shows a flow diagram of an example implementation of a method 100 for detecting anomalies in a positioning system.

Figure 2:
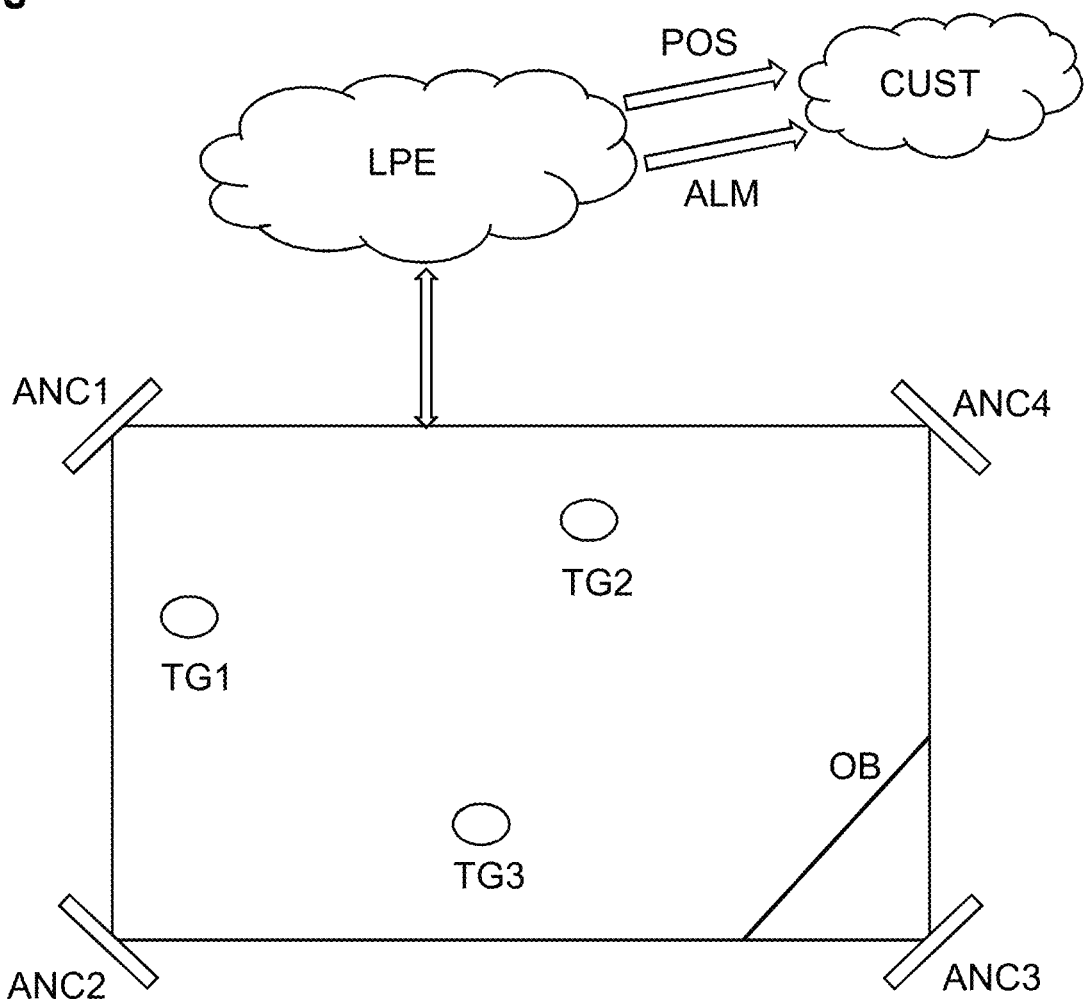
FIG. 2 shows an example configuration of a positioning system.

An example of such a positioning system is shown in FIG. 2, in which a room or area with four locator devices ANC1, ANC2, ANC3, ANC4 is depicted together with a positioning engine LPE. In the present example three mobile devices TG1, TG2 and TG3 are located in this room or area. The positioning engine LPE is in communication with the locator devices ANC1 to ANC4 and/or the mobile devices TG1 to TG3. The chosen numbers for the locator devices and mobile devices should serve only as an example and other numbers of locator devices and mobile devices could be chosen as well.

The mobile devices can be tags that transmit or receive a radio frequency, RF, signal like a Bluetooth direction finding signal, which includes a constant tone extension packet, CTE. Other RF signals like Wi-Fi signals, ultra-wideband, UWB, or cellular signals could be used as an alternative, for example. Such signals are transmitted between the mobile devices and the locator devices. For example, the respective RF signals transmitted between one of the locator devices and one of the mobile devices can be used to determine a direction, a distance, or a direction and a distance between that locator device and that mobile device. If a direction is determined, both an angle of arrival, AoA, and an angle of departure, AoD, can be determined. The determination is performed either in the locator device or the mobile device, depending on the technology used.

In general, all the mentioned determinations can be summarized as location indicators that, for example, indicate a position of the respective mobile device relative to the respective locator device. Corresponding methods for determining such location indicators are known to the skilled person and therefore not described in more detail here.

Referring back to FIG. 1, step 101, respective ones of such location indicators associated with at least one of the mobile devices TG1, TG2, TG3 are received from one or more of the locator devices ANC1, ANC2, ANC3, ANC4 or from the at least one of the mobile devices. For example, the location indicators are received in the positioning engine LPE.

In step 102 a position of the at least one mobile device is determined based on the received location indicators. Also this step may be performed in the positioning engine LPE. For determining the position, a lower limit of locator devices is two if direction is included in the location indicator, and four if only a distance is included in the location indicator.

In step 103 a confidence indicator is acquired for at least one of the location indicators received. The confidence indicator is associated with the at least one of the location indicators. For example, for each of the location indicators received, an associated confidence indicator is acquired. Various implementations for the acquisition of the confidence indicators will be described in more detail below. Each confidence indicator, in general, can be taken as a measure or indicator of how trustworthy the associated location indicator is, being the basis for optionally discarding or flagging any results based on this location indicator.

For example, in step 104 for each acquired confidence indicator it is determined whether a confidence criterion is met. If the confidence criterion is not met, an anomaly indicator is stored in an anomaly cache. Each anomaly indicator is associated with a locator device, e.g. the locator device, for which the location indicator is received or to which the location indicator is linked via its relation to a mobile device. This association can easily be made due to the association of the location indicator and the confidence indicator. Optionally, the anomaly indicator is further associated with the mobile device with which the confidence indicator is associated via the corresponding location indicator. Further information, like timestamps or the like, can also be stored with the anomaly indicator in the anomaly cache.

Figure 3:
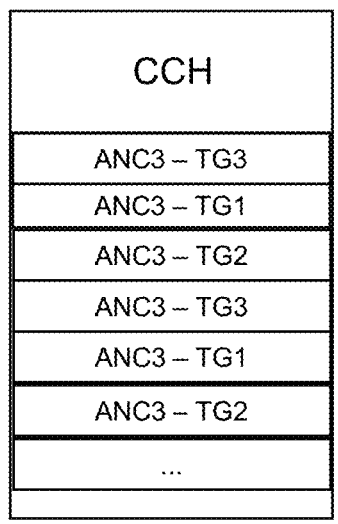
FIG. 3 shows an example implementation of an anomaly cache.

An example of such an anomaly cache CCH is shown in FIG. 3. Here, just as an example, anomaly indicators for the locator device ANC3 in combination with each of the mobile devices TG1, TG2 and TG3 are stored. Other combinations are not excluded.

Referring back to FIG. 2, such anomaly indicators may be based on the situation that the locator device ANC3 is hidden or obstructed by an obstacle OB, such that the respective confidence indicators for location indicators related to the locator device ANC3 do not meet the confidence criterion set in the positioning system.

Referring back to FIG. 1, in step 105 the anomaly indicators are evaluated, e.g. for one or more of the locator devices. Based on that evaluation, an anomaly alert message for the one or more locator devices may be generated.

Referring to the example of the anomaly cache CCH of FIG. 3, an anomaly alert message may be generated for locator device ANC3 as a certain number of anomaly indicators for that locator device ANC3 is exceeded. The evaluation may further be based on a predefined period of time, during which respective anomaly indicators are stored for the locator device. For example, only anomaly indicators that have been stored during the predefined period of time are taken into account, if a defined number of anomaly indicators being stored in the anomaly cache has to be exceeded.

However, other ways of evaluation can be chosen in addition or as an alternative for determining whether an anomaly alert message has to be sent out for a locator device or not. For example, the evaluation of the anomaly indicators can also be based on an output of a trained machine learning algorithm processing the stored anomaly indicators and/or the confidence indicators associated with the stored anomaly indicators. For example, the training data for the machine learning algorithm enable the algorithm to decide whether stored anomaly indicators lead to the necessity of generating an anomaly alert message or not.

The method 100 can be performed continuously, such that the method starts over with step 101 by receiving further location indicators.

Referring back to FIG. 2, the determined position(s) of the mobile device(s) TG1, TG2, TG3 may be provided to a customer CUST. Furthermore, the alarm message ALM, if any, may be provided to the customer CUST.

As mentioned above, acquiring the confidence indicator may comprise receiving quality information associated with the at least one of the location indicators and determining the confidence indicator based on the received quality information. In general, such quality information may include some measure or indicator about the quality of the RF signal transmitted between the locator device and the mobile device. The quality information may also include a quality value associated with the respective locator device, like a known accuracy of the locator device and/or a quality of the antenna array employed by the locator device. For example, the number of antenna elements of the antenna array of the locator device can be used for assessing quality information. For example, antenna arrays with a higher number of antenna elements are rated with a higher quality than those with a lower number of antenna elements. The confidence criterion may be a quality threshold or derived from such quality threshold, for example.

In some implementations acquiring the confidence indicator may comprise receiving or determining a weight factor associated with a location indicator and/or the locator device for which this location indicator is received, and determining the confidence indicator based on the weight factor. For example, the position of the mobile device associated with the location indicator is determined based on the respective location indicators and the weight factor. For example, such a weight factor may be derived from quality information as described above. However, the quality information in such a case need not be evaluated directly but only the resulting weight factor is used for the determination of the confidence indicator. A weight factor may also be determined based on a distance of the estimated position of the mobile device and the respective locator device, assuming that higher distances reduce the accuracy of the corresponding location indicator. The confidence criterion may be a threshold weight or derived from such threshold weight, for example.

Another way of acquiring the confidence indicator is evaluating the location indicator itself with respect to the determined position of the mobile device. This will be described in the following.

Figure 4:
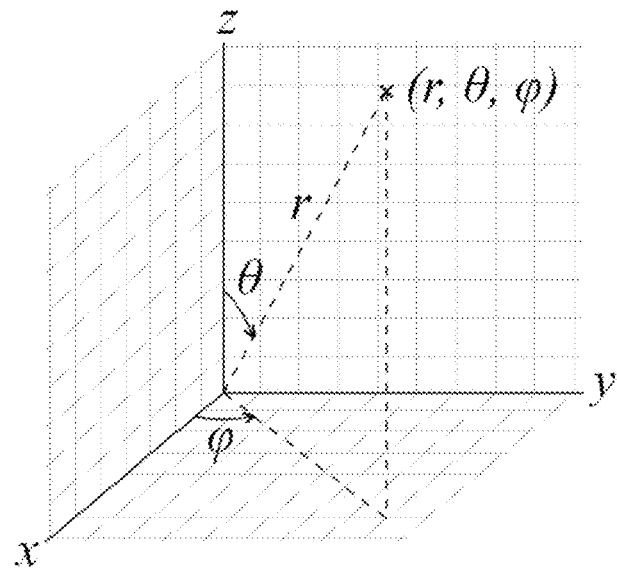
FIG. 4 shows an example vector with a spherical coordinates definition.

Referring now to FIG. 4, a definition of spherical coordinates is shown that is going to be used in the following disclosure.

In mathematics, a spherical coordinate system is a coordinate system for three-dimensional space where the position of a point is specified by three numbers: the radial distance r of that point from a fixed origin, its polar angle $\theta$ measured from a fixed zenith direction, and the azimuthal angle $\varphi$ of its orthogonal projection on a reference plane that passes through the origin and is orthogonal to the zenith, measured from a fixed reference direction on that plane.

The spherical coordinates vary at the following range:

$$r \geq 0 \quad 0 \leq \theta \leq \pi \quad 0 \leq \varphi < 2\pi \text{ or } -\pi < \varphi \leq \pi \quad (1)$$

The transformation between spherical and Cartesian coordinates is given by the following formulas:

$$r = \sqrt{x^2 + y^2 + z^2} \quad (2)$$

$$\theta = \cos^{-1}\left(\frac{z}{\sqrt{x^2 + y^2 + z^2}}\right) = \tan^{-1}\left(\frac{x^2 + y^2}{z}\right)$$

$$\varphi = \tan^{-1}\left(\frac{y}{x}\right)$$

$$x = r\cos\varphi\sin\theta \quad (3)$$

$$y = r\sin\varphi\sin\theta$$

$$z = r\cos\theta$$

Figure 5:
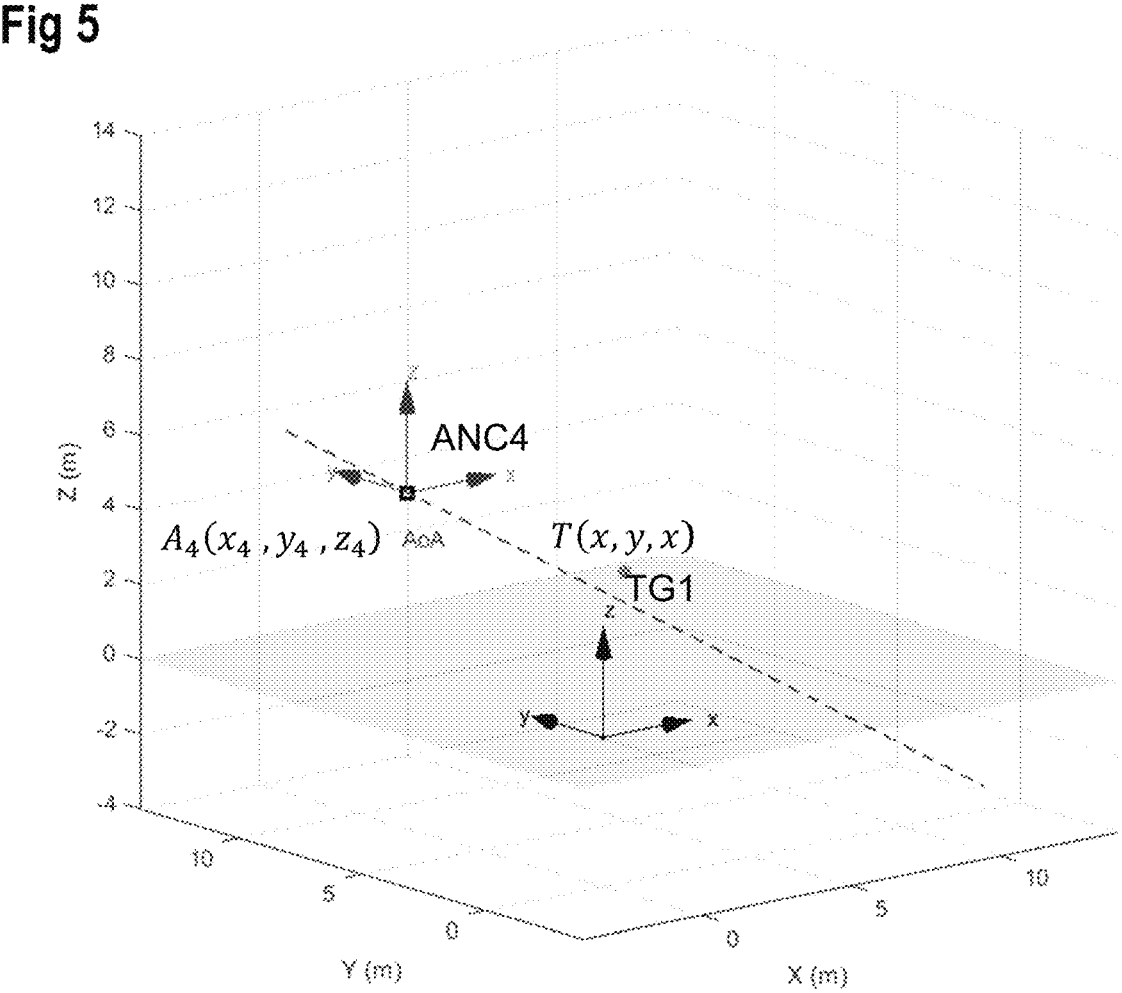
FIG. 5 shows an example 3D view of a locator device and a mobile device with a linear locus.

Referring now to FIG. 5, locator device ANC4 is shown that measures a direction between itself and the mobile device TG1. That direction is a location indicator as used in this disclosure.

For example, such a locator device, after the appropriate coordinate transformations, provides two angles $\varphi$ and $\theta$ which are the spherical coordinates of the target, except of the "r". These two angles are measured with respect to global coordinate axes that have been transferred to the position of the locator device without changing its orientation.

The direction on which the target, i.e. the mobile device TG1, is located, relative to the locator device's position is given by the directional vector $\vec{\delta}_i$ which is defined in equation (4), with i being the index of the respective locator device:

Measured Angles:

$$\vec{\delta}_i = \begin{bmatrix} \delta_{ix} \\ \delta_{iy} \\ \delta_{iz} \end{bmatrix} = \begin{bmatrix} \cos\varphi_i \cdot \sin\theta_i \\ \sin\varphi_i \cdot \sin\theta_i \\ \cos\theta_i \end{bmatrix} \quad (4)$$

$$\varphi_i, \theta_i$$

Directional vector $\vec{\delta}_i$ ideally defines completely a 3D straight line which contains the locator device ANC4 and the mobile device TG1, provided that no error has occurred.

Let us suppose that the mobile device TG1 and the locator device ANC4 are located at the points T(x,y,x) and $A_4(x_4, y_4, z_4)$ respectively. Then we can assert that $$\overrightarrow{A_4T} = \begin{bmatrix} x - x_4 \\ y - y_4 \\ z - z_4 \end{bmatrix}, \vec{\delta}_i = \begin{bmatrix} \delta_{ix} \\ \delta_{iy} \\ \delta_{iz} \end{bmatrix} \quad (5)$$

$$\overrightarrow{A_4T}/\vec{\delta}_i \Rightarrow \begin{cases} \dfrac{x - x_4}{y - y_4} = \dfrac{\delta_{ix}}{\delta_{iy}} \\ \dfrac{y - y_4}{z - z_4} = \dfrac{\delta_{iy}}{\delta_{iz}} \end{cases} \Rightarrow \begin{cases} \delta_{iy}x - \delta_{ix}y = \delta_{iy}x_4 - \delta_{ix}y_4 \\ \delta_{iz}y - \delta_{iy}z = \delta_{iz}y_4 - \delta_{iy}z_4 \end{cases}$$

The last equation (5) represents the aforementioned 3D straight line which is depicted in FIG. 5.

Following this scheme, using also location indicators for other locator devices for the mobile device TG1 a LS solution using pseudo-inverse can be applied for determining the estimated position $\hat{X}$ of the mobile device TG1:

$$HX = B \Rightarrow \hat{X} = [(H^T H)^{-1} H^T] B \quad (6)$$

with H and B resembling equation (5) in matrix form including the additional location indicators for the mobile device TG1.

However, the actual ground truth position of the mobile device TG1 may deviate from the estimated output $\hat{X}$ of the mobile device TG1 if one or more of the location indicators are inaccurate. While some inaccuracies may not be prevented, faulty measurements and therefore faulty location indicators may severely influence the estimated position. The deviation from the actual position can be determined for each location indicator. With respect to the example of FIG. 5, the dashed line indicating the directional vector δ indicates where the mobile device TG1 would be, if the location indicator was fully correct. However, as can be seen from FIG. 5, there is a slight deviation of the ground truth position from the dashed line. The dashed line resembles a locus of the directional vector, i.e. possible positions in view of the location indicator.

Such loci can also be shown for the other locator devices of the positioning system.

For example, the estimated position of the mobile device TG1 and the respective distances between that estimated position and the loci is used to determine whether a locus behaves as an outlier or not, i.e. whether the respective locus is reasonable with respect to estimated position. For example, referring to FIG. 6A and FIG. 6B, respective loci for five locator devices ANC1 to ANC5 are shown, in FIG. 6A in a 3D view and in FIG. 6B in a 2D view, resembling a top view of FIG. 6A. In particular, two distance spheres of the locator devices ANC1 and ANC2 together with a resulting plane locus are shown, as well as line loci of locator devices ANC3 and ANC4 and a point locus of locator device ANC5.

Figure 6A:
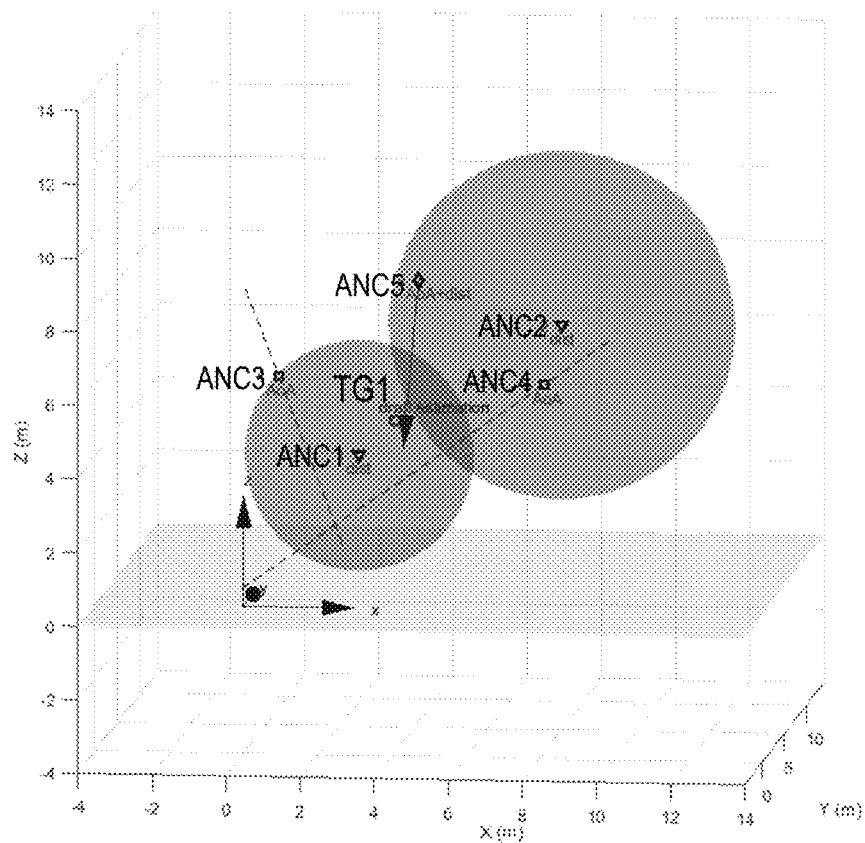
FIGS. 6A and 6B show example 3D and 2D views of locator devices and a mobile device with respective loci.
Figure 6B:
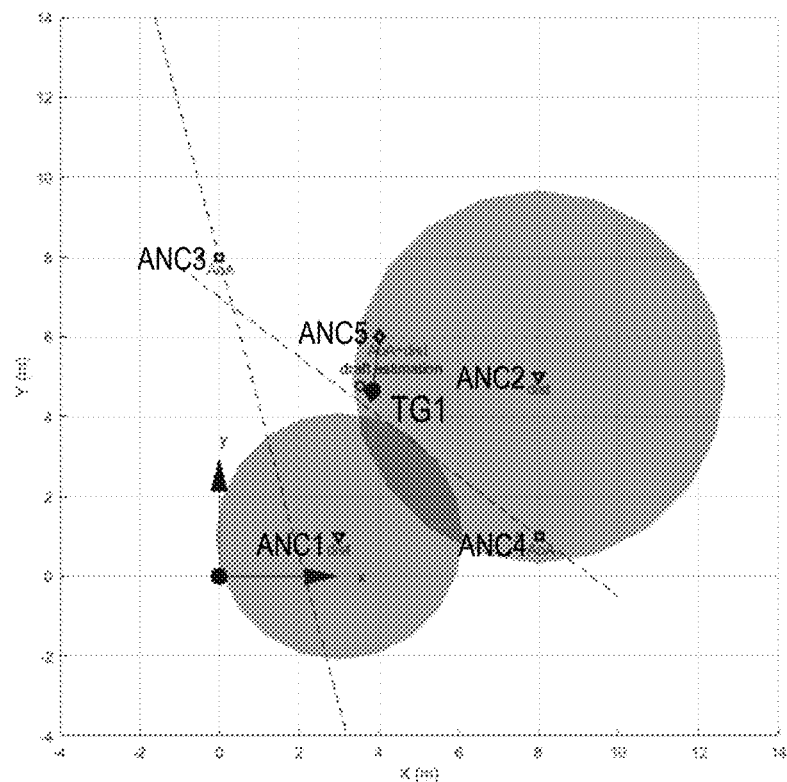

If we look carefully at the example room with the five locator devices ANC1 to ANC5, we will observe that with respect to the estimated position, called a draft estimation in FIGS. 6A and 6B, of the mobile device TG1, the straight line locus, which is defined by locator device ANC3, behaves as an outlier. Although locator device ANC3 with the corresponding line locus may have its own contribution on the determination of the estimated position, together with the other locator devices, it nevertheless can be seen that the locus of locator device ANC3 has a large distance from the estimated position of the mobile device TG1, which is determined using a LS solution based on all the loci. Therefore locator device ANC3 is suspicious for being an outlier.

A distance between the estimated position of the mobile device TG1 and the line locus of locator device ANC3 can be determined with known methods of linear algebra. The resulting distance value can be used to determine the confidence indicator. For example, if the distance value and/or the resulting confidence indicator exceeds a threshold value, the anomaly indicator may be generated and stored in the anomaly cache for locator device ANC3. The confidence criterion in such case may be a threshold distance or derived from such threshold distance, for example.

The distance value determined this way may also be used to determine a weight factor for this locator device. For example, higher distance values lead to a lower weight factor for the corresponding locator device, respectively locus. For example, the LS algorithm of equation (6) may be extended to a weighted LS, WLS, algorithm for refining the estimated position. Further details on such weight factors, loci, distances to loci and their application in a WLS algorithm can be found in u-blox application EP 21197751.7, filed on Sep. 20, 2021, which is incorporated herein by reference in its entirety.

Hence, with the various implementations described above for the improved processing concept, various situations can be accounted for which require or take advantage of sending out anomaly alert messages, such that the specific situation could be corrected. For example, the improved processing concept may come into effect if one or more locator devices are misaligned, actively or by mistake, or are overloaded by rogue tags or other mobile devices. Also in a situation where a locator device is hacked and starts sending fake data, the improved processing concept may detect this situation and generate the corresponding alert message. The same applies if the locator device is dead and/or bricked because of repeated crashes or the like. For example, as shown in FIG. 2, a temporary obstacle can block the antenna of the locator device, e.g. leading to a decrease of the signal quality and/or accuracy.

It should be apparent that the example situations are not to be taken in a limiting manner and other situations where the confidence in the location indicators and/or the locator devices is decreased can occur.

Various embodiments of the improved processing concept can be implemented in the form of logic in software or hardware or a combination of both. The logic may be stored in a computer readable or machine-readable storage medium as a set of instructions adapted to direct one or more processors of a (distributed) computer system to perform a set of steps disclosed in embodiments of the improved processing concept. The logic may form part of a computer program product adapted to direct an information-processing device to automatically perform a set of steps disclosed in embodiments of the improved processing concept.

The specification and drawings are, accordingly, to be regarded in an illustrative rather than a restrictive sense. However, it will be evident that various modifications and changes may be made thereunto without departing from the scope of the invention as set forth in the claims.

LIST OF REFERENCE SIGNS

100 method for detecting anomalies
101-105 steps
ANC, ANC2, ANC3, ANC4, ANC5 locator device
TG1, TG2, TG3 mobile device OB obstacle
CUST customer
LPE positioning engine
POS positioning information
ALM alert messages
CCH cache

The invention claimed is:

1. A method for detecting anomalies in a positioning system, the method comprising
receiving, for a plurality of locator devices, respective location indicators associated with at least one mobile device;
determining a position of the at least one mobile device based on the received location indicators;
acquiring, for at least one of the received location indicators, a confidence indicator associated with the at least one of the location indicators;
determining, for each acquired confidence indicator, whether a confidence criterion is met, and storing an anomaly indicator in an anomaly cache, if the confidence criterion is not met, wherein each anomaly indicator is associated with the locator device, for which the location indicator is received; and
generating an anomaly alert message for at least one of the locator devices based on an evaluation of the anomaly indicators that are stored for the at least one of the locator devices.

2. The method according to claim 1, wherein each location indicator includes at least one of:
a direction between the respective locator device and the mobile device;
a distance between the respective locator device and the mobile device; or
a direction and a distance between the respective locator device and the mobile device.

3. The method according to claim 1, wherein acquiring the confidence indicator comprises:
defining a locus that is based on the at least one of the location indicators, the locus being associated with the at least one mobile device;
determining a distance value between the determined position of the at least one mobile device and the locus; and
determining the confidence indicator based on the determined distance value.

4. The method according to claim 1, wherein acquiring the confidence indicator comprises:
determining a further distance value between the determined position of the at least one mobile device and a known position of the locator device, for which the at least one of the location indicators is received; and
determining the confidence indicator based on the determined further distance value.

5. The method according to claim 1, wherein acquiring the confidence indicator comprises;
receiving or determining a weight factor associated with the at least one of the location indicators and/or the locator device, for which the at least one of the location indicators is received; and
determining the confidence indicator based on the weight factor; and
determining the position of the at least one mobile device based on the received location indicators and the weight factor.

6. The method according to claim 1, wherein acquiring the confidence indicator comprises;
receiving quality information associated with the at least one of the location indicators, wherein the quality information comprises at least one of:
a signal strength associated with the at least one of the location indicators;
a number of antenna elements of the locator device, for which the at least one of the location indicators is received;
a noise value, in particular signal-to-noise ratio, associated with the at least one of the location indicators; or
a quality value of a reference period of a sine wave associated with the at least one of the location indicators; and
wherein acquiring the confidence indicator further comprises determining the confidence indicator based on the received quality information.

7. The method according to claim 1, wherein each anomaly indicator is further associated with the mobile device, with which the confidence indicator is associated via the corresponding location indicator.

8. The method according to claim 1, wherein generating the anomaly alert message is further based on an evaluation of the anomaly indicators that are stored for the at least one of the locator devices within a predefined period of time.

9. The method according to claim 1, wherein the evaluation of the anomaly indicators is based on at least one of the following:
a number of the anomaly indicators that are stored for the at least one of the locator devices;
an output of a trained machine-learning algorithm processing the stored anomaly indicators and/or the confidence indicators associated with the stored anomaly indicators.

10. A positioning engine for a positioning system, the positioning engine comprising being configured for:
at least one processor; and
memory interoperably coupled with the at least one processor and having tangible, non- transitory, machine-readable media storing one or more instructions that, when executed by the at least one processor, cause the at least one processor to perform operations comprising:
-receiving, for a plurality of locator devices, respective location indicators associated with at least one mobile device;
determining a position of the at least one mobile device based on the received location indicators;
acquiring, for at least one of the location indicators received, a confidence indicator associated with the at least one of the location indicators;
determining, for each acquired confidence indicator, whether a confidence criterion is met, and storing an anomaly indicator in an anomaly cache, if the confidence criterion is not met, wherein each anomaly indicator is associated with the locator device, for which the location indicator is received; and
generating an anomaly alert message for at least one of the locator devices based on an evaluation of the anomaly indicators that are stored for the at least one of the locator devices.

11. The positioning engine according to claim 10, wherein for acquiring the confidence indicator, the one or more instructions, when executed by the at least one processor, further cause the at least one processor to perform operations including:

defining a locus that is based on the at least one of the location indicators, the locus being associated with the at least one mobile device;

determining a distance value between the determined position of the at least one mobile device and the locus; and determining the confidence indicator based on the determined distance value.

12. The positioning engine according to claim 10, wherein for acquiring the confidence indicator, the one or more instructions, when executed by the at least one processor, further cause the at least one processor to perform operations including;

receiving quality information associated with the at least one of the location indicators, and determining the confidence indicator based on the received quality information, wherein the quality information comprises at least one of:

a signal strength associated with the at least one of the location indicators;

a number of antenna elements of the locator device, for which the at least one of the location indicators is received;

a noise value, in particular signal-to-noise ratio, associated with the at least one of the location indicators; or a quality value of a reference period of a sine wave associated with the at least one of the location indicators.

13. The positioning engine according to claim 10, wherein the one or more instructions, when executed by the at least one processor, further cause the at least one processor to perform operations including:

generating the anomaly alert message based on an evaluation of the anomaly indicators that are stored for the at least one of the locator devices within a predefined period of time.

14. One or more tangible, non-transitory, computer-readable media storing instructions that, when executed by one or more processors, cause the one or more processors to perform operations comprising:

receiving, for a plurality of locator devices, respective location indicators associated with at least one mobile device;

determining a position of the at least one mobile device based on the received location indicators;

acquiring, for at least one of the received location indicators, a confidence indicator associated with the at least one of the location indicators;

determining, for each acquired confidence indicator, whether a confidence criterion is met, and storing an anomaly indicator in an anomaly cache, if the confidence criterion is not met, wherein each anomaly indicator is associated with the locator device, for which the location indicator is received; and generating an anomaly alert message for at least one of the locator devices based on an evaluation of the anomaly indicators that are stored for the at least one of the locator devices.

15. The one or more tangible, non-transitory, computer-readable media according to claim 14, wherein each location indicator includes at least one of:

a direction between the respective locator device and the mobile device;

a distance between the respective locator device and the mobile device; or a direction and a distance between the respective locator device and the mobile device.

16. The one or more tangible, non-transitory, computer-readable media according to claim 14, wherein for acquiring the confidence indicator, the instructions, when executed by the one or more processors, further cause the one or more processors to perform operations including:

defining a locus that is based on the at least one of the location indicators, the locus being associated with the at least one mobile device;

determining a distance value between the determined position of the at least one mobile device and the locus; and determining the confidence indicator based on the determined distance value.

17. The one or more tangible, non-transitory, computer-readable media according to claim 14, wherein for acquiring the confidence indicator, the instructions, when executed by the one or more processors, further cause the one or more processors to perform operations including:

determining a further distance value between the determined position of the at least one mobile device and a known position of the locator device, for which the at least one of the location indicators is received; and determining the confidence indicator based on the determined further distance value.

18. The one or more tangible, non-transitory, computer-readable media according to claim 14, wherein for acquiring the confidence indicator, the instructions, when executed by the one or more processors, further cause the one or more processors to perform operations including:

receiving or determining a weight factor associated with the at least one of the location indicators and/or the locator device, for which the at least one of the location indicators is received; and determining the confidence indicator based on the weight factor; and determining the position of the at least one mobile device based on the received location indicators and the weight factor.

19. The one or more tangible, non-transitory, computer-readable media according to claim 14, wherein for acquiring the confidence indicator, the instructions, when executed by the one or more processors, further cause the one or more processors to perform operations including:

receiving quality information associated with the at least one of the location indicators, and determining the confidence indicator based on the received quality information wherein the quality information comprises at least one of:

a signal strength associated with the at least one of the location indicators;

a number of antenna elements of the locator device, for which the at least one of the location indicators is received;

a noise value, in particular signal-to-noise ratio, associated with the at least one of the location indicators; or a quality value of a reference period of a sine wave associated with the at least one of the location indicators.

20. The one or more tangible, non-transitory, computer-readable media according to claim 14, wherein each anomaly indicator is further associated with the mobile device, with which the confidence indicator is associated via the corresponding location indicator.

\* \* \* \* \*